United States Patent [19]
Yoshimura et al.

[11] 3,748,978
[45] July 31, 1973

[54] EXPOSURE TIME CONTROLS FOR CAMERAS OPERATING WITH FLASH ILLUMINATION

[75] Inventors: Hirofumi Yoshimura, Okaya; Hisatoshi Takahata, Nagano; Akio Furuhata, Okaya; Susumu Nishimura, Nagano, all of Japan

[73] Assignee: Kabushiki Kaisha Yashica, Tokyo, Japan

[22] Filed: Nov. 3, 1971

[21] Appl. No.: 195,305

[30] Foreign Application Priority Data
Nov. 9, 1970 Japan.............................. 45/98524

[52] U.S. Cl............................. 95/10 CE, 95/10 CT
[51] Int. Cl. ............................................. G03b 7/08
[58] Field of Search..................... 95/10 CT, 11.5 R, 95/10 CE

[56] References Cited
UNITED STATES PATENTS
3,522,763   8/1970   Dietz....................................... 95/10
3,610,122   10/1971   Biber....................................... 95/10

*Primary Examiner*—Samuel S. Matthews
*Assistant Examiner*—Michael L. Gellner
*Attorney*—Harold D. Steinberg et al.

[57] ABSTRACT

A camera which can provide flash illumination, particularly for reducing the exposure time. The camera shutter is automatically closed when the charge of a timing capacitor increases to a given extent. Simultaneously with the creation of the flash illumination, a suitable circuit generates an electrical signal which is used to charge the capacitor so as to coact therewith for achieving a predetermined exposure time. The capacitor is also charged by a photosensitive element which responds to the light created during flash illumination, so that the predetermined exposure time will be reduced to the extent that the capacitor is charged by the photosensitive element.

9 Claims, 4 Drawing Figures

PATENTED JUL 31 1973 3,748,978
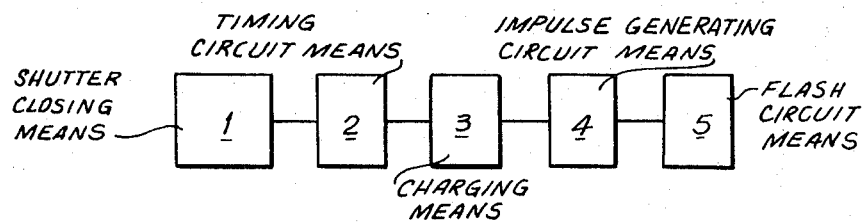
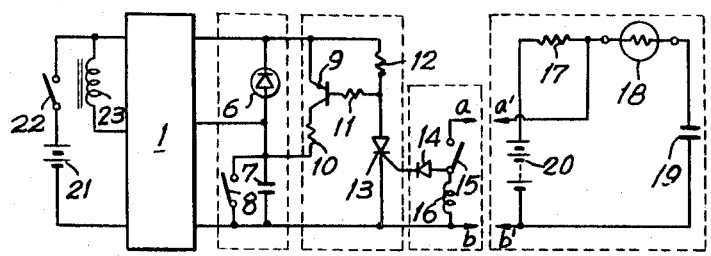
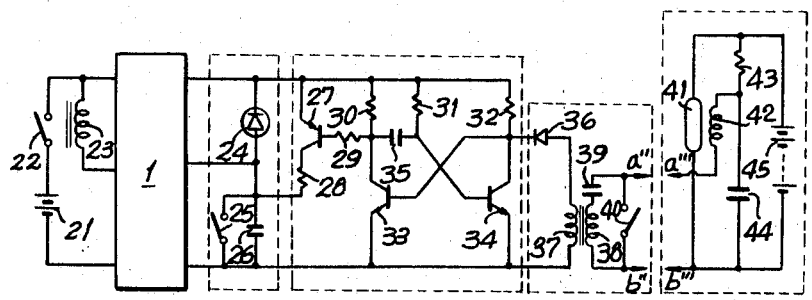
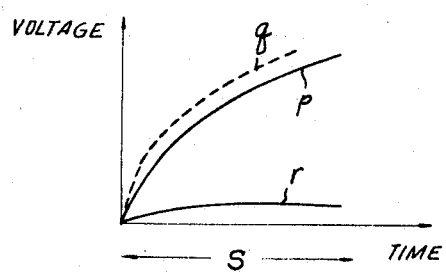
INVENTORS
HIROFUMI YOSHIMURA
HISATOSHI TAKAHATA
AKIO FURUHATA
SUSUMU NISHIMURA
BY
Steinberg and Blake
ATTORNEYS

EXPOSURE TIME CONTROLS FOR CAMERAS OPERATING WITH FLASH ILLUMINATION

BACKGROUND OF THE INVENTION

The present invention relates to cameras.

The present invention relates in particular to cameras which are capable of automatically determining the exposure time.

Thus, it is conventional to provide cameras capable of controlling automatically the exposure time with structures which include photoelectric elements adapted to change their resistance value or a photoelectric current value in accordance with the light intensity at an object which is to be photographed. Such cameras are of advantage in that the exposure time can be controlled electrically in an automatic manner in accordance with the intensity of the light at the object which is to be photographed.

However, cameras of this type have a disadvantage in that the quality of the photograph may be undesirably influenced by factors such as movement of the object which is photographed or movement of the camera when it is hand-held during relatively long exposure times which may be longer than an exposure time on the order of one thirtieth second, for example. Under these latter conditions the operator normally may not be aware that the hand-held camera may move during exposure so as to create a poor photograph, and for this reason it has been proposed to incorporate into a camera a device which will indicate the latter conditions to the operator before an exposure is made, so as to achieve in this way photographs of better quality. A preferable arrangement for solving this latter problem is one where the camera includes a structure informing the operator that the exposure should be made with flash illumination under conditions where the exposure time would be too long for a proper exposure when the camera is hand-held, so that with the added light achieved by the flash illumination it is possible to reduce the exposure time, and thus it is still possible to automatically provide an exposure time which is short enough to prevent movement of a hand-held camera from undesirably influencing the quality of the photograph.

Cameras of the above general type are usually provided with photosensitive elements such as a CdS (cadmium sulfide) resistor, which in a well known manner responds to light so as to control the exposure time. However, this latter type of photosensitive element is not highly sensitive in its response to light, so that when there is a relatively small extent of illumination the CdS type of photosensitive element is incapable of responding with sufficient rapidity to the instantaneous flash of light created with an automatic flash structure. As a result even when a photograph is made with additional illumination from a flash structure there is the danger of an exposure time which is too long if the shutter is controlled by a signal determined by the response of a CdS type of photosensitive element to the flash illumination.

In order to solve this latter problem it has been essential to correct the exposure time determined on the basis of the intensity of the light received by the CdS element, under conditions where the object to be photographed is illuminated with flash illumination. Such correction has been achieved by way of a fixed resistor connected in parallel with the CdS element through a suitable switch in a suitable electrical circuit. During exposure with flash illumination, the camera operator will close this latter switch so that the exposure time will be determined by a time constant of an RC timer circuit which includes the latter fixed resistor and a capacitor set to achieve a constant exposure time which may, for example, be one thirtieth second. This latter capacitor is charged on the basis of the sum of the electric current flowing through the CdS element and the fixed resistor, so that the shutter is closed after an exposure time which is substantially less than the exposure time which would otherwise be determined solely by way of the fixed resistor and capacitor without the additional charge received from the CdS element. Exposure time correcting circuits of this latter type are disclosed in the Japanese Patent Publication No. 1968-10260 and in U.S. Pat. No. 3,326,103.

However, these latter types of structures require the operator to select the use of the fixed resistor during exposure with flash illumination, and this requirement is a serious disadvantage since the operator may forget, for example, to connect the fixed resistor to the circuit.

SUMMARY OF THE INVENTION

It is accordingly a primary object of the present invention to provide a structure which will avoid the above drawbacks.

In particular, it is an object of the present invention to provide a structure capable of correcting the timing of the exposure under conditions where the exposure is made with flash illumination while at the same time avoiding any erroneous operation of the camera due to forgetfulness on the part of the operator.

Thus, it is an object of the invention to provide for a structure of the above type circuitry which will automatically correct the exposure time in a highly reliable manner in the event that flash illumination is used under conditions as set forth above.

Another object of the present invention is to provide a structure of the above type which will not be capable of undesirably creating flash illumination if the operator forgets to remove the flash structure from the camera.

It is also an object of the present invention to provide a structure of the above general type which includes a photosensitive means which has a greater degree of sensitivity to light than the conventional CdS element.

Yet another object of the present invention is to provide a structure of the above general type which is relatively simple and inexpensive to manufacture while at the same time operating very reliably to achieve the desired results.

According to the invention the camera includes a shutter-opening means for starting an exposure and a shutter-closing means for terminating the exposure. A timing circuit means is electrically connected with the shutter-closing means for actuating the latter to close the shutter so as to terminate the exposure. This timing circuit means includes a capacitor means which actuates the shutter-closing means when the terminal voltage of the capacitor means rises to a predetermined extent. A photosensitive means also forms part of the timing circuit means and is electrically connected with the capacitor means for charging the latter in accordance with light which is received by the photosensitive means. A flash circuit means is provided for creating flash illumination, when the flash circuit means has a suitable source of flash illumination connected thereto, and the photosensitive means responds to the light created during flash illumination for charging the capacitor means. An signal-generating circuit means is electrically connected with the flash circuit means for rendering the latter operative to create flash illumination in synchronism with opening of the shutter and for generating an electrical signal simultaneously with the creation of the flash illumination. A charging means is electrically connected to the signal-generating circuit means to receive the electrical impulse therefrom and is also electrically connected to the capacitor means for charging the latter to a predetermined extent in response to receiving the electrical signal from the signal-generating circuit means. This charging of the capacitor means by the charging means with the signal from the signal-generating circuit means provides a predetermined exposure time which is diminished to the extent that the capacitor means is charged by the photosensitive means when the latter receives the light from the flash illumination.

BRIEF DESCRIPTION OF DRAWINGS

The invention is illustrated by way of example in the accompanying drawings which form part of this application and in which:

FIG. 1 is a schematic block diagram of the present invention;

FIG. 2 is a wiring diagram of one embodiment of the present invention;

FIG. 3 is a wiring diagram of another embodiment of the present invention; and

FIG. 4 is a graph illustrating the manner in which the structure of the invention operates.

DESCRIPTION OF PREFERRED EMBODIMENTS

Referring to the block diagram of FIG. 1, there is illustrated therein a shutter-closing means 1 which in a well known manner is electrically actuated for closing a shutter so as to terminate the exposure. A timing circuit means 2 is electrically connected with the shutter-closing means 1 so as to actuate the latter to close the shutter after elapse of an exposure time determined by the timing circuit means 2. This timing circuit means 2 includes a timing capacitor, referred to in greater detail below, and this capacitor is charged by a charging means 3 which serves to provide with the capacitor a predetermined exposure time. The charging circuit means 3 is rendered operative when it receives an electrical signal or impulse from a signal or impulse-generating circuit means 4. This impulse-generating circuit means 4 is electrically connected with a flash circuit means 5 to render the latter operative in synchronism with opening of the shutter so that the flash circuit means 5 will create flash illumination, the impulse-generating circuit means 4 generating simultaneously with the creating of the flash illumination an electrical impulse which operates the charging means 3 so that it will coact with the timing capacitor of the timing circuit means 2 in order to provide a predetermined exposure time.

With this construction it is to be assumed that the flash circuit means 5 is electrically connected to the impulse-generating circuit means 4 when the operator inserts a synchro-plug of a flash-gun into a synchro-socket of the camera. With the structure in this condition, an energy storage part of the flash circuit means 5 is supplied with energy for generation of electrical pulses from the power source used to create the flash illumination, and this latter operation is brought about by actuating the flash circuit means 5 in order to create the flash illumination. When a synchronous switch of the impulse-generating circuit means 4 is closed simultaneously with opening of the shutter, the electrical pulse is generated by the impulse-generating circuit means 4 in synchronism with the creating of the flash illumination by the flash circuit means 5. This impulse which is generated drives the charging means 3 so as to charge the capacitor of the timing circuit means 2, this charge being determined by the sum of the output current of the charging circuit means 3 and the charge on the capacitor derived from a photosensitive means of the timing circuit means, this photosensitive means responding to light so as to contribute to the charge of the timing capacitor. When the terminal voltage of the timing capacitor reaches a predetermined value after elapse of the required charging time, the shutter-closing means 1 is automatically actuated to close the shutter and terminate the exposure. Under these conditions the exposure time will never be greater than the time determined by the charging of the timing capacitor with the charging means 3 from the impulse derived from the impulse-generating circuit means 4, since the capacitor is also simultaneously charged due to the operation of the photosensitive means which responds also to the light created by the flash illumination.

Referring to the embodiment of the invention which is illustrated in FIG. 2, it will be seen that the parts which form the timing circuit means 2 includes the photosensitive means 6 in the form of a solar battery and the timing capacitor 7 which is electrically connected with the solar battery 6, this timing capacitor 7 being bridged by a normally closed trigger switch 8.

The charging means 3 of the embodiment of FIG. 2 includes the transistor 9 and the electrical resistors 10–12 electrically connected in circuit therewith as illustrated in FIG. 2, this charging circuit means also including the SCR 13.

The impulse-generating circuit means includes the diode 14, the synchronous switch 15 which automatically closes when the shutter reaches its fully open position, as is well known, and the impulse-generating coil 16.

The flash circuit means 5 includes the resistor 17, a suitable socket to connect the flash bulb 18 into the circuit, a capacitor 19 to generate a pulse for firing the flash bulb, and a power source 20.

An electrical connecting means is provided for removably connecting the flash circuit means 5 to the impulse-generating circuit means 4. This connecting means includes the schematically illustrated terminals $a$, $b$ and $a'$, $b'$. The former terminals are electrically connected with the latter terminals, respectively, when the flash gun is mounted on the camera.

Thus, when the flash circuit means 5 is electrically connected into the circuit by way of these terminals, so as to enable the camera to make exposures with flash illumination, the energy from the power source 20 is stored in the capacitor 19 through the resistor 17 and the bulb 18. The camera includes a shutter-opening means formed by the switch 22 which is automatically closed when the shutter-tripping plunger of the camera is depressed, and the closing of this switch 22 connects the power source 21 into the circuit and energizes the relay 23 which in a known manner releases the cocked shutter so that it will automatically assume its open position and which at the same time opens the normally closed switch 8. Thus, during the final range of movement of the shutter-operating plunger the cocked shutter is released so that it automatically opens and simultaneously the trigger switch 8 is opened.

When the shutter has almost reached its fully open position it will in a well known manner automatically close the synchronous switch 15 so as to operate the flash circuit means to create flash illuminations in synchronism with exposure of the film by the open shutter. The closing of the switch 15 will cause the charge stored in the capacitor 19 to be momentarily converted into an electrical pulse which fires the bulb 18 and which in addition is applied through the terminals of the electrical connecting means to the coil 16.

This coil 16 of the impulse-generating circuit means will now bring about generation across the opposite ends of the coil of a potential pulse in the form of an electrical impulse which is applied through the diode 14 to the gate of the SCR 13 so as to render the latter conductive. As a result the transistor 9 is also rendered conductive and the capacitor 7 is charged with the output current of the transistor 9. At the same time the photosensitive means formed by the solar battery 6 responds not only to the ambient light but also to the light created by the firing of the bulb 18 so as to additionally charge the timing capacitor 7. Thus the light received by the solar battery 6 generates a current which also contributes to the charge of the capacitor 7.

When the terminal voltage of the capacitor 7 rises to a given value, the shutter-closing means 1 is automatically actuated to close the shutter and terminate the exposure. The smaller the amount of light reflected from the object to be photographed to the photosensitive means 6, the smaller is the extent to which the capacitor 7 is charged from the photosensitive means 6 due to photoelectrically converted current thereof. However, the exposure time never exceeds a time which is determined by the output current of the transistor 9 and the capacitor 7, this latter time being a time constant which cannot be exceeded since this latter exposure time will be diminished to the extent that the capacitor 7 is charged with the photosensitive means 6 in response to light received thereby.

Thus, with this embodiment of the invention which is illustrated in FIG. 2, the closing of the synchronous switch 15 which is conventional, when the flash circuit means is electrically connected with the camera, brings about a correction of the exposure time which otherwise would be achieved only by way of the photosensitive means 6 itself.

It is to be noted that with the embodiment of FIG. 2 when the flash bulb 18 is not connected into the circuit of the flash circuit means 5, the exposure time correcting circuitry will not operate since the capacitor 19 cannot be charged. The flash bulb 18 must be connected into the circuit in order to make it possible to charge the capacitor 19. Thus, this embodiment has an advantage in that the exposure time is corrected only during flash photography while at the same time other types of photography, with available natural light, can be properly carried out even if the operator should carelessly leave the flash circuit means 5 connected to the camera.

In the embodiment of the invention which is illustrated in FIG. 3, the timing circuit means 2 includes the solar battery 24, which forms the photosensitive means, the normally closed trigger switch 25, and the capacitor means 26, all of these components operating in the manner of the corresponding components of FIG. 2.

The charging means 3 of FIG. 3 is formed by the transistor 27, the resistors 28 and 29, and a monostable multivibrator which includes the transistors 33 and 34, a capacitor 35, and resistors 30–32.

The impulse-generating circuit means 4 of the embodiment of FIG. 3 includes a booster transformer having the coils 37 and 38 as well as a diode 36, a capacitor 39, and the synchronous switch 40 which operates in the same way as the switch 15 referred to above.

The flash circuit means 5 of the embodiment of FIG. 3 includes the discharge tube 41, a trigger coil 42, a resistor 43, a capacitor 44 for triggering the discharge tube 41, and a power source 45. The terminals $a''$, $b''$ and $a''$, $b'''$ form an electrical connecting means for removably connecting the flash circuit means to the camera in the same way as was described above in connection with FIG. 2.

With the embodiment of FIG. 3 when the electrical connection is established through the above terminals of the electrical connecting means, and the synchronous switch 40 is in its open position, the electrical charge from the power source 45 is stored in the capacitor 44 through the resistor 43, so that this charge in the capacitor 44 still is not available for triggering the discharge tube 41. Part of this charge is also stored in the capacitor 39 through the terminals $a'''$ and $a''$.

The camera structure used with the embodiment of FIG. 3 is the same as that used with the embodiment of of FIG. 2, so that when the shutter has almost reached its fully open position the shutter will automatically close the synchronous switch 40 in the manner described above. Now the electrical charge which has been stored in the capacitor 44 is converted into a momentary electrical pulse which is in turn applied to the trigger coil 42 so as to trigger the discharge tube 41 and thus create the flash illumination. In synchronism with this latter operation the electrical charge which was stored in the capacitor 39 also is momentarily converted into an electrical current which flows through the circuit which includes the transformer coil 38 and the synchronous switch 40. An impulse is thus generated across the opposite ends of the coil 38, and this impulse is amplified by the transformer coil 37. As a result a positive potential pulse is applied through the diode 36 to the base of the transistor 33, and this transistor 33 is brought into its state of conductivity while the transistor 34 is transferred into its non-conductive state. As a result the transistor 27 is rendered conductive, and the capacitor 26 is charged with the output of the transistor 27. Inasmuch as the state of conductivity of the transistor 33 is maintained only for a predetermined time depending upon the resistance 31 and the capacitor 35, the resistance value of the resistor 31 and the capacity of the capacitor 35 are chosen or regulated in such a way that the time which depends upon the resistor 31 and capacitor 35 never exceeds the predetermined time essential for flash photography, namely the time required for the terminal voltage of the capacitor 26 to rise due to transfer of the transistor 27 to its state of conductivity, assuming that there is no influence from the solar battery. As a result the exposure time never exceeds the predetermined time constant, as determined by operation without the solar battery, since the latter provides and additional charge simultaneously with the flash illumination.

The graph of FIG. 4 illustrates the manner in which the capacitors 7 and 26 operate in order to achieve the corrections in accordance with the present invention. In the graph of FIG. 4, the ordinate represents the terminal voltage of the timing capacitor 7 or 26, while the abscissa represents time according to increments which represent fractional parts of a second. Thus, the three curves of FIG. 4 illustrate the manner in which the terminal voltage rises during the exposure time which is represented along the abscissa. The time constant achieved without the use of the solar batteries 6 or 24 is represented by the curve $p$. This curve represents the speed with which the terminal voltage of the capacitor rises without any influence from the photosensitive means formed by the solar battery 6 of FIG. 2 or the solar battery 24 of FIG. 3.

The curve $r$ illustrates how the terminal voltage of the capacitor rises as a result of the influence of the solar battery alone.

As is apparent from the above description, with both embodiments of the invention the terminal voltage is rising not only as illustrated by the curve $p$ but also simultaneously as illustrated by the curve $r$, so that the actual rise in terminal voltage is represented by the dotted line curve $q$, which represents the sum of the curves $p$ and $r$, and thus it is clear that the terminal voltage of the timing capacitor will reach the required value for triggering the closing of the shutter in a time which is shorter than the predetermined time provided by the time constant as illustrated by the curve $p$.

Thus, in accordance with the present invention it is possible to correct the exposure time automatically in response to a signal at the instant of flash light emission simply by connecting the impulse generating circuit means with the flash circuit means, and in addition it is possible to carry out available light photography such as photography with daylight inasmuch as the exposure time correcting circuit is not rendered operative when there is no flash illumination. With previously known constructions, however, the exposure time correcting circuit is indeed activated even when there is no flash illumination, so that unless the flash structure is removed there will unavoidably be an undesirable influence on the exposure which is made under available light conditions or daylight conditions without flash.

Also, in accordance with the invention the instant of flash illumination is precisely synchronized with the instant when the shutter has been opened, and the exposure time is determined with a minimum error in accordance with the light reflected from the object which is photographed, so as to result in photographs of high quality even when exposures are made under conditions where otherwise any slight movement of a hand-held camera would result in a blurred image or a photograph of poor quality.

A further advantage of the invention resides in using for the photosensitive means a photoelectromotive element of high photosensitivity, such as the solar batteries 6 and 24, since this type of element responds very quickly to the flash illumination and thereby assures a more precise correction. However, even if the photosensitive means were in the form of a CdS element which has a relatively low photosensitivity, there would still be achieved with the present invention a correction of the exposure time with an error considerably smaller than would otherwise be achieved.

Although the structure of the present invention has been described above and illustrated in the drawing as including the charging circuit means 3, the impulse generating circuit means 4, and the flash circuit means 5, details of which are illustrated in FIGS. 2 and 3, these circuits may be replaced by equivalents which cooperate together to achieve also the results of the present invention.

What is claimed is:

1. In a camera, shutter-opening means for opening a shutter to start an exposure, shutter-closing means for closing the shutter to terminate an exposure, timing circuit means electrically connected with said shutter-closing means for actuating the latter to close the shutter, said timing circuit means including a capacitor means which actuates said shutter-closing means to terminate an exposure when the terminal voltage of said capacitor means rises to a given extent, said timing circuit means also including a photosensitive means for responding to light and electrically connected with said capacitor means for charging the latter in response to light received by said photosensitive means, flash circuit means for creating flash illumination to which said photosensitive means responds when a source of flash illumination is electrically connected with said flash circuit means, signal-generating circuit means electrically connected with said flash circuit means for rendering the latter operative in synchronism with opening of the shutter and for generating an electrical signal simultaneously with the creation of flash illumination by said flash circuit means, and charging means electrically connected with said capacitor means and with said signal-generating circuit means for receiving the electrical signal generated by the latter and for charging said capacitor means to a given extent when said signal is received by said charging means from said signal-generating circuit means, said charging means and capacitor means providing a predetermined exposure time which is diminished by the extent to which the capacitor means is charged by said photosensitive means in response to light received thereby during flash illumination.

2. The combination of claim 1 and wherein said photosensitive means is a solar battery.

3. The combination of claim 1 and wherein an electrical connecting means is provided for removably connecting said flash circuit means electrically with said impulse-generating circuit means.

4. The combination of claim 3 and wherein said flash circuit means coacts with a source of flash illumination for removably receiving the latter and said source of flash illumination rendering said flash circuit means operative only when said source of flash illumination is connected into said flash circuit means, so that even if the latter remains connected with said signal-generating circuit means said flash circuit means will not operate unless a source of flash illumination is connected therewith.

5. The combination of claim 1 and wherein said signal-generating circuit means includes a coil for generating said electrical signal when said signal-generating circuit means renders said flash circuit means operative to create a flash, said charging means including an SCR electrically connected with said coil to be rendered conductive by the singal generated thereby, and said charging means including a transistor electrically connected with said capacitor means and with said SCR to be rendered conductive when said SCR is rendered conductive by said electrical signal for then charging said capacitor means to said given extent.

6. The combination of claim 1 and wherein said charging means includes a monostable multivibrator for receiving said electrical signal from said signal-generating circuit means and for then charging said capacitor means to said given extent.

7. The combination of claim 6 and wherein said signal-generating circuit means includes a booster transformer electrically connected with said monostable multivibrator and creating said electrical signal when said signal-generating circuit means renders said flash circuit means operative to create the flash illumination.

8. The combination of claim 1 and wherein said signal-generating circuit means includes only a single switch for rendering said flash circuit means operative in synchronism with opening of the shutter.

9. The combination of claim 1 and wherein said timing circuit means inclues only a single switch, said switch being a normally closed trigger switch bridging said capacitor means and adapted to be opened when the shutter opens to start the charging of said capacitor means.

* * * * *